(12) United States Patent
Kobayashi

(10) Patent No.: US 9,658,811 B2
(45) Date of Patent: May 23, 2017

(54) PRINTING APPARATUS, NON-TRANSITORY COMPUTER READABLE MEDIUM, AND PRINTING METHOD

(71) Applicant: FUJI XEROX CO., LTD., Tokyo (JP)

(72) Inventor: Katsuki Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/017,732

(22) Filed: Feb. 8, 2016

(65) Prior Publication Data

US 2017/0068495 A1  Mar. 9, 2017

(30) Foreign Application Priority Data

Sep. 8, 2015  (JP) .................................. 2015-176510

(51) Int. Cl.
| | |
|---|---|
| H04N 1/04 | (2006.01) |
| G06F 3/12 | (2006.01) |
| G03G 15/00 | (2006.01) |
| G03G 21/04 | (2006.01) |

(52) U.S. Cl.
CPC ....... G06F 3/1263 (2013.01); G03G 15/5087 (2013.01); G03G 21/04 (2013.01); G06F 3/1207 (2013.01); G06F 3/1292 (2013.01)

(58) Field of Classification Search
CPC ..... G06F 3/1263; G06F 3/1207; G06F 3/1292
USPC ....................................... 358/1.15, 1.14, 1.9
See application file for complete search history.

(56) References Cited

U.S. PATENT DOCUMENTS

| | | | | |
|---|---|---|---|---|
| 2016/0028912 A1* | 1/2016 | Harada | ............... | H04N 1/00923 358/1.15 |
| 2016/0127592 A1* | 5/2016 | Nakamura | ......... | H04N 1/00923 358/1.13 |
| 2016/0224297 A1* | 8/2016 | Wind | .................... | G06F 3/1204 |

FOREIGN PATENT DOCUMENTS

| | | |
|---|---|---|
| JP | 2007-257066 A | 10/2007 |
| JP | 2010206677 A | 9/2010 |
| JP | 2013162313 A | 8/2013 |

* cited by examiner

*Primary Examiner* — Houshang Safaipour
(74) *Attorney, Agent, or Firm* — Oliff PLC

(57) ABSTRACT

A printing apparatus includes a memory that stores, upon request from a first print-instruction originator, first print-instruction information that instructs the printing apparatus to print, in association with the first print-instruction originator, and stores, upon request from a second print-instruction originator, second print-instruction information that instructs the printing apparatus to print, in association with the second print-instruction originator, and a printing unit that executes, in an order determined by a predetermined rule, a print job based on the first print-instruction information stored in association with the first print-instruction originator, and a print job based on the second print-instruction information stored in association with the second print-instruction originator, when a first terminal apparatus used by the first print-instruction originator and a second terminal apparatus used by the second print-instruction originator exist within a predetermined first distance with reference to the printing apparatus.

14 Claims, 11 Drawing Sheets

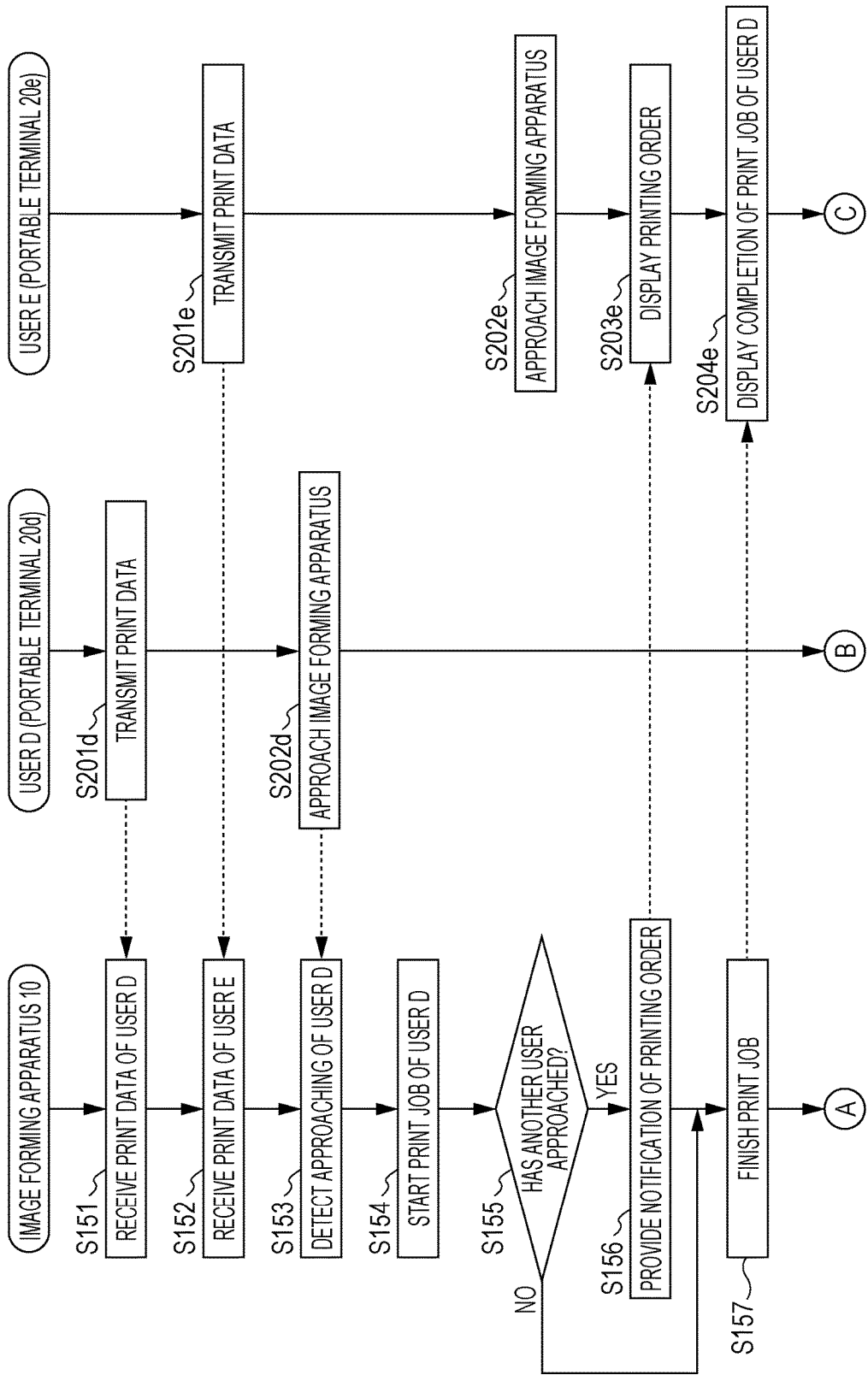

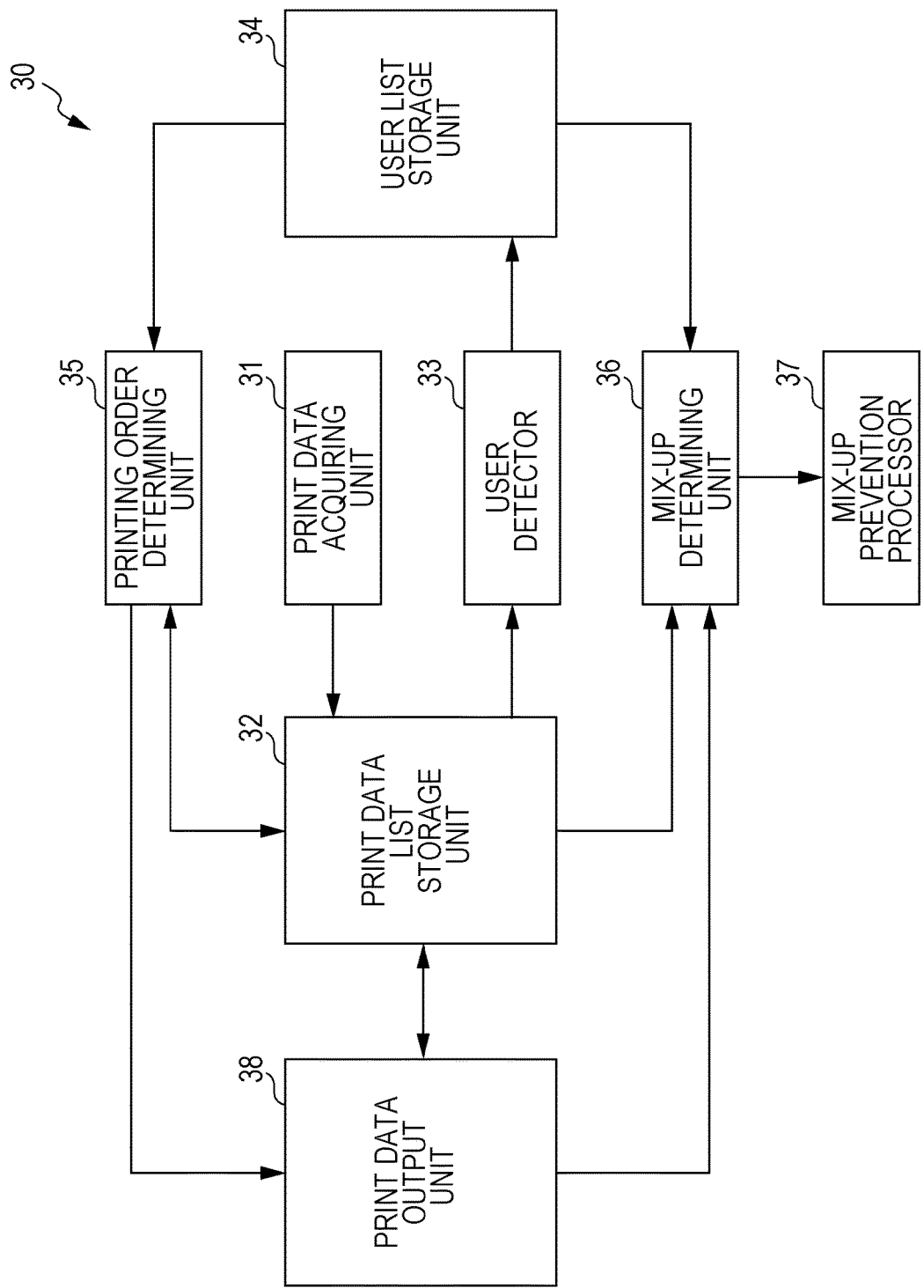

FIG. 6A

| STORAGE NO. | USER INFORMATION | PRINT DATA | PRINT STATUS | PRINTING ORDER |
|---|---|---|---|---|
| 1 | USER A | PRINT DATA A | PRINTING | |
| 2 | USER C | PRINT DATA C | | |
| 3 | USER B | PRINT DATA B | | |

FIG. 6B

| STORAGE NO. | USER INFORMATION | PRINT DATA | PRINT STATUS | PRINTING ORDER |
|---|---|---|---|---|
| 1 | USER A | PRINT DATA A | PRINTING | 1 |
| 2 | USER C | PRINT DATA C | IN QUEUE | 3 |
| 3 | USER B | PRINT DATA B | IN QUEUE | 2 |

FIG. 6C

| STORAGE NO. | USER INFORMATION | PRINT DATA | PRINT STATUS | PRINTING ORDER |
|---|---|---|---|---|
| 1 | USER D | PRINT DATA D | PRINTING | 1 |
| 2 | USER E | PRINT DATA E | IN QUEUE | 2 |

FIG. 6D

| STORAGE NO. | USER INFORMATION | PRINT DATA | PRINT STATUS | PRINTING ORDER |
|---|---|---|---|---|
| 1 | USER D | PRINT DATA D | COMPLETE | 1 |
| 2 | USER E | PRINT DATA E | IN QUEUE | 2 |

FIG. 7A

| APPROACH NO. | USER INFORMATION |
|---|---|
| 1 | USER A |

FIG. 7B

| APPROACH NO. | USER INFORMATION |
|---|---|
| 1 | USER A |
| 2 | USER B |
| 3 | USER C |

FIG. 7C

| APPROACH NO. | USER INFORMATION |
|---|---|
| 1 | USER D |
| 2 | USER E |

FIG. 7D

| APPROACH NO. | USER INFORMATION |
|---|---|
| 1 | USER E |

PRINTING APPARATUS, NON-TRANSITORY COMPUTER READABLE MEDIUM, AND PRINTING METHOD

CROSS-REFERENCE TO RELATED APPLICATIONS

This application is based on and claims priority under 35 USC 119 from Japanese Patent Application No. 2015-176510 filed Sep. 8, 2015.

BACKGROUND

Technical Field

The present invention relates to a printing apparatus, a non-transitory computer readable medium, and a printing method.

SUMMARY

According to an aspect of the invention, there is provided a printing apparatus including a memory that stores, upon request from a first print-instruction originator, first print-instruction information that instructs the printing apparatus to print, in association with the first print-instruction originator, and stores, upon request from a second print-instruction originator, second print-instruction information that instructs the printing apparatus to print, in association with the second print-instruction originator, and a printing unit that executes, in an order determined by a predetermined rule, a print job based on the first print-instruction information stored in association with the first print-instruction originator, and a print job based on the second print-instruction information stored in association with the second print-instruction originator, when a first terminal apparatus used by the first print-instruction originator and a second terminal apparatus used by the second print-instruction originator exist within a predetermined first distance with reference to the printing apparatus.

BRIEF DESCRIPTION OF THE DRAWINGS

Exemplary embodiment of the present invention will be described in detail based on the following figures, wherein:

FIG. 4A is a sequence diagram illustrating an example of the procedure for preventing a mix-up of printed materials between different users;

FIG. 5 is a block diagram illustrating an example of the functional configuration of an information processor according to an exemplary embodiment of the present invention;

FIGS. 6A to 6D each illustrate an example of the contents of a print data list;

FIGS. 7A to 7D each illustrate an example of the contents of a user data list;

DETAILED DESCRIPTION

Hereinafter, an exemplary embodiment of the present invention will be described in detail with reference to the attached drawings.

General Arrangement of Image Forming System

Figure 1:
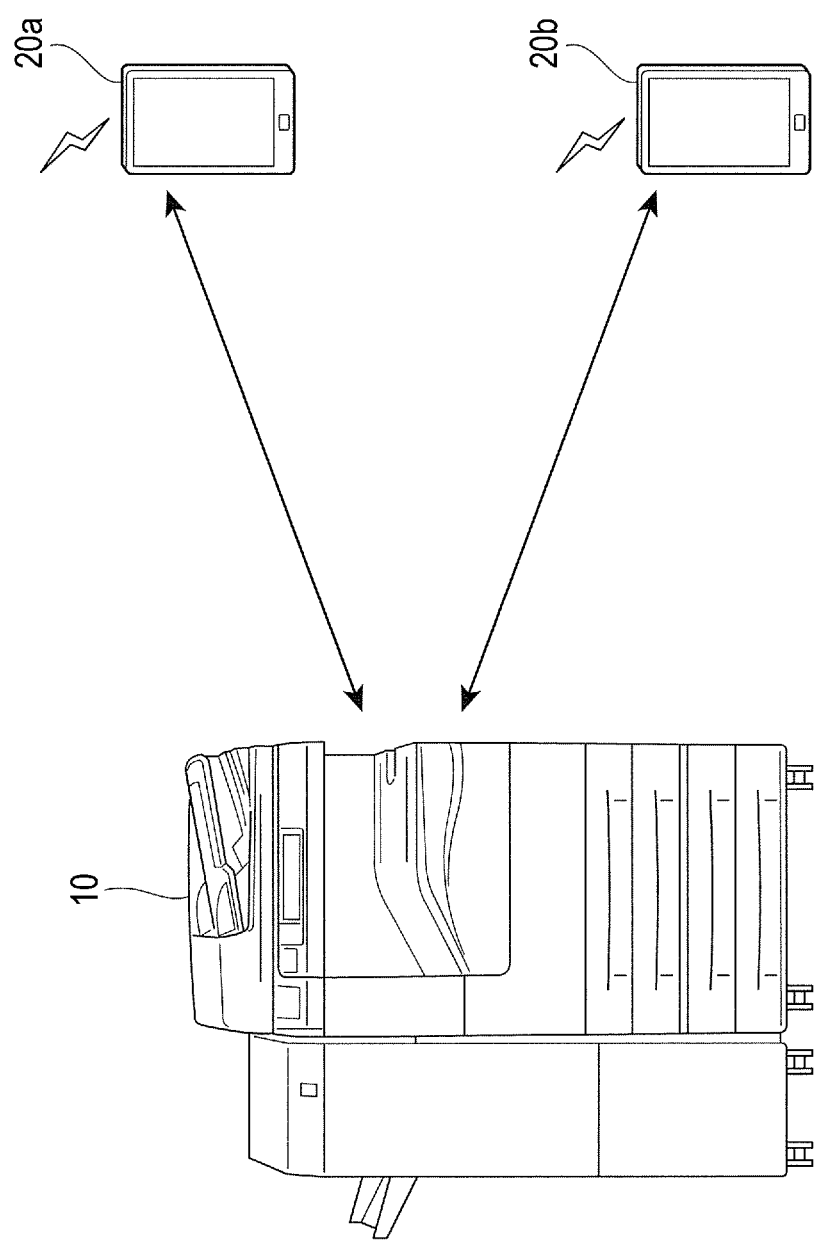
FIG. 1 illustrates an example of the general arrangement of an image forming system according to an exemplary embodiment of the present invention.

FIG. 1 illustrates an example of the general arrangement of an image forming system according to the exemplary embodiment. As illustrated in FIG. 1, the image forming system includes an image forming apparatus 10, and portable terminals 20a and 20b. Each of the portable terminals 20a and 20b will be referred to simply as portable terminal 20 when there is no need to distinguish between the portable terminals 20a and 20b. Further, the number of portable terminals 20 is not limited to two.

The image forming apparatus 10, which is an example of a printing apparatus, is an apparatus that forms an image on a recording medium such as paper. The image forming apparatus 10 may be an apparatus that further performs operations such as reading of an image from a recording medium and receiving of an image from a public line. For example, the image forming apparatus 10 is a printer from the perspective of performing only image formation, a copier from the perspective of performing image reading and image formation, and a facsimile receiver from the perspective of performing image reception and image formation.

The portable terminal 20, which is an example of a terminal apparatus, is a portable terminal apparatus used to instruct the image forming apparatus 10 to form an image. Further, the portable terminal 20 has a wireless communication capability. The portable terminal 20 used may be, for example, a cellular phone, a smart phone, or a tablet PC.

Hardware Configuration of Image Forming Apparatus

Figure 2:
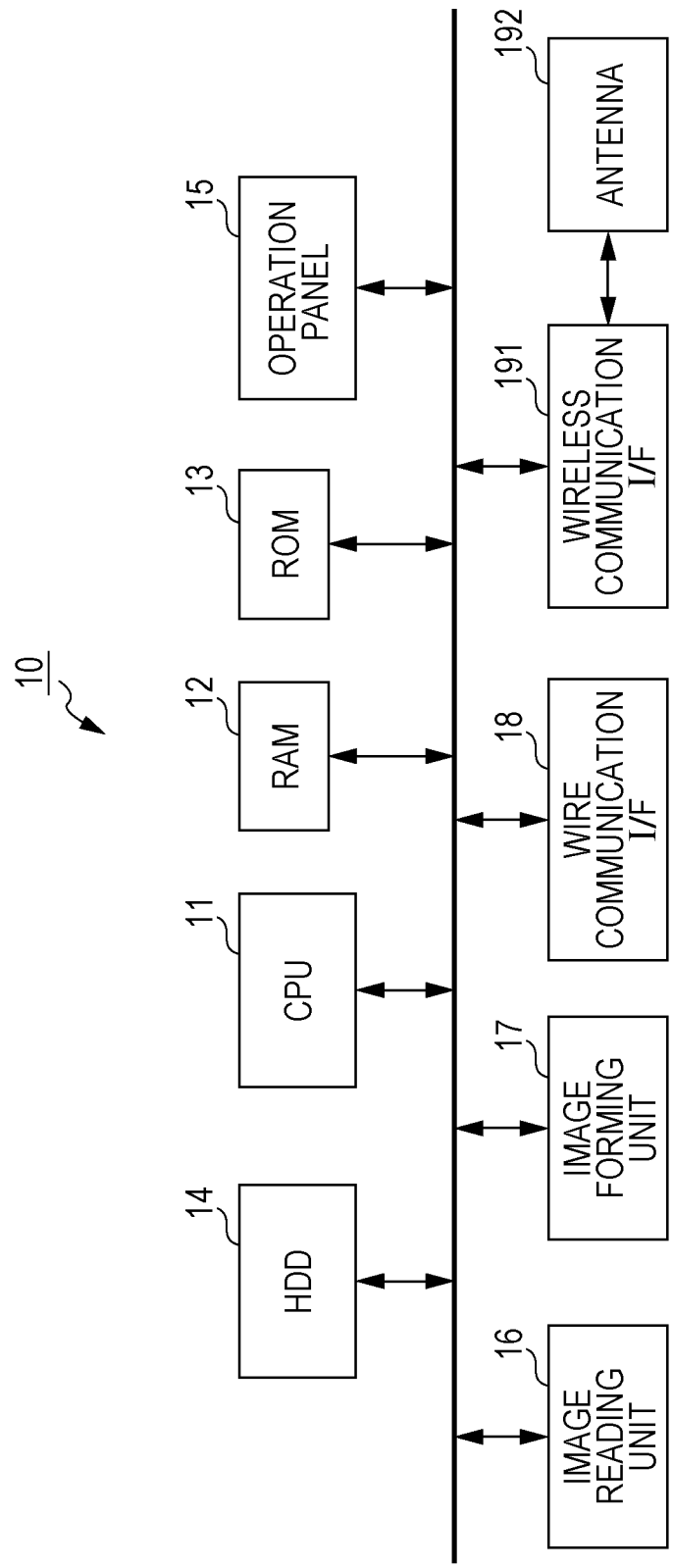
FIG. 2 illustrates an example of the hardware configuration of an image forming apparatus according to an exemplary embodiment of the present invention.

FIG. 2 illustrates an example of the hardware configuration of the image forming apparatus 10 according to the exemplary embodiment. As illustrated in FIG. 2, the image forming apparatus 10 includes a central processing unit (CPU) 11, a random access memory (RAM) 12, a read only memory (ROM) 13, a hard disk drive (HDD) 14, an operation panel 15, an image reading unit 16, an image forming unit 17, a wire communication interface (to be referred to as "wire communication I/F" hereinafter) 18, and a wireless communication interface (to be referred to as "wireless communication I/F" hereinafter) 191, and an antenna 192.

The CPU 11 loads various programs stored in, for example, the ROM 13 into the RAM 12 and executes the programs to implement various functions described later.

The RAM 12 is a memory used as, for example, a working memory for the CPU 11.

The ROM 13 is a memory that stores, for example, various programs executed by the CPU 11.

The HDD 14 is, for example, a magnetic disk device that stores data, such as image data read by the image reading unit 16 and image data used when the image forming unit 17 forms an image.

The operation panel 15 is, for example, a touch panel that displays various information and receives operational inputs from the user. The operation panel 15 includes a display for displaying various information, and a position detection sheet for detecting the position indicated by a finger or a stylus. Alternatively, a display and a keyboard may be used instead of a touch panel.

The image reading unit 16 reads an image recorded on a recording medium such as paper. The image reading unit 16 is, for example, a scanner. The image reading unit 16 used may employ the CCD system, in which light is applied to a document from a light source and the reflected light is condensed by a lens before being received by charge coupled devices (CCDs), or the CIS system, in which light is applied sequentially from each LED light source and the reflected light is received by a contact image sensor (CIS).

The image forming unit 17, which is an example of a printing unit, forms an image on a recording medium. The image forming unit 17 is, for example, a printing apparatus. The image forming unit 17 used may employ the electrophotographic system, in which toner adhered onto a photoconductor is transferred to a recording medium to form an image on the recording medium, or the ink jet system, in which ink is discharged onto a recording medium to form an image on the recording medium.

The wire communication I/F 18 transmits and receives various information to and from the portable terminal 20 through wire communication when the portable terminal 20 has a wired connection. An example of wire communication used in this case is Ethernet®.

The wireless communication I/F 191 transmits and receives various information to and from the portable terminal 20 through wireless communication when the portable terminal 20 does not have a wired connection. Examples of wireless communication used in this case include Bluetooth®, Wi-Fi®, and near field communication (NFC).

The antenna 192 sends various information supplied from the wireless communication I/F 191 to a wireless network environment via radio waves. The antenna 192 also supplies various information received from a wireless network environment via radio waves to the wireless communication I/F 191.

General Operation of Image Forming Apparatus

In the image forming system illustrated in FIG. 1, when the user transmits print data by using the portable terminal 20, the wire communication I/F 18 or the wireless communication I/F 191 of the image forming apparatus 10 receives this print data. Then, the image forming apparatus 10 stores the print data transmitted from the portable terminal 20 in association with user information indicating the user of the portable terminal 20. The term "print data" as used herein refers to one collective set of data with various print settings added to the image data to be printed, such as the number of copies to be printed, the size of the recording medium, N-up (a type of printing in which N pages of an electronic document are laid out on a single page of the recording medium), and margin size. In the exemplary embodiment, print data is used as an example of print-instruction information that instructs the image forming apparatus to print.

Thereafter, when the user approaches the image forming apparatus 10 while carrying the portable terminal 20, the image forming apparatus 10 calculates the distance to the portable terminal 20 based on the intensity of radio waves generated by the portable terminal 20, and acquires user information indicating the user of the portable terminal 20. Then, when the distance to the portable terminal 20 becomes less than a predetermined first distance, a print job based on print data associated with the user information is executed. In the following description, the "predetermined first distance" will be referred to as "print start distance".

With the image forming system described above, situations may occur where multiple users who have transmitted print data to the image forming apparatus 10 approach the image forming apparatus 10. In such situations, according to the exemplary embodiment, the image forming apparatus 10 determines the order in which print jobs based on individual pieces of print data are to be executed, to be one of the orders described below.

A first order is the order in which individual pieces of print data are stored.

A second order is the in which individual users who have transmitted print data approach the image forming apparatus 10.

Figure 3:
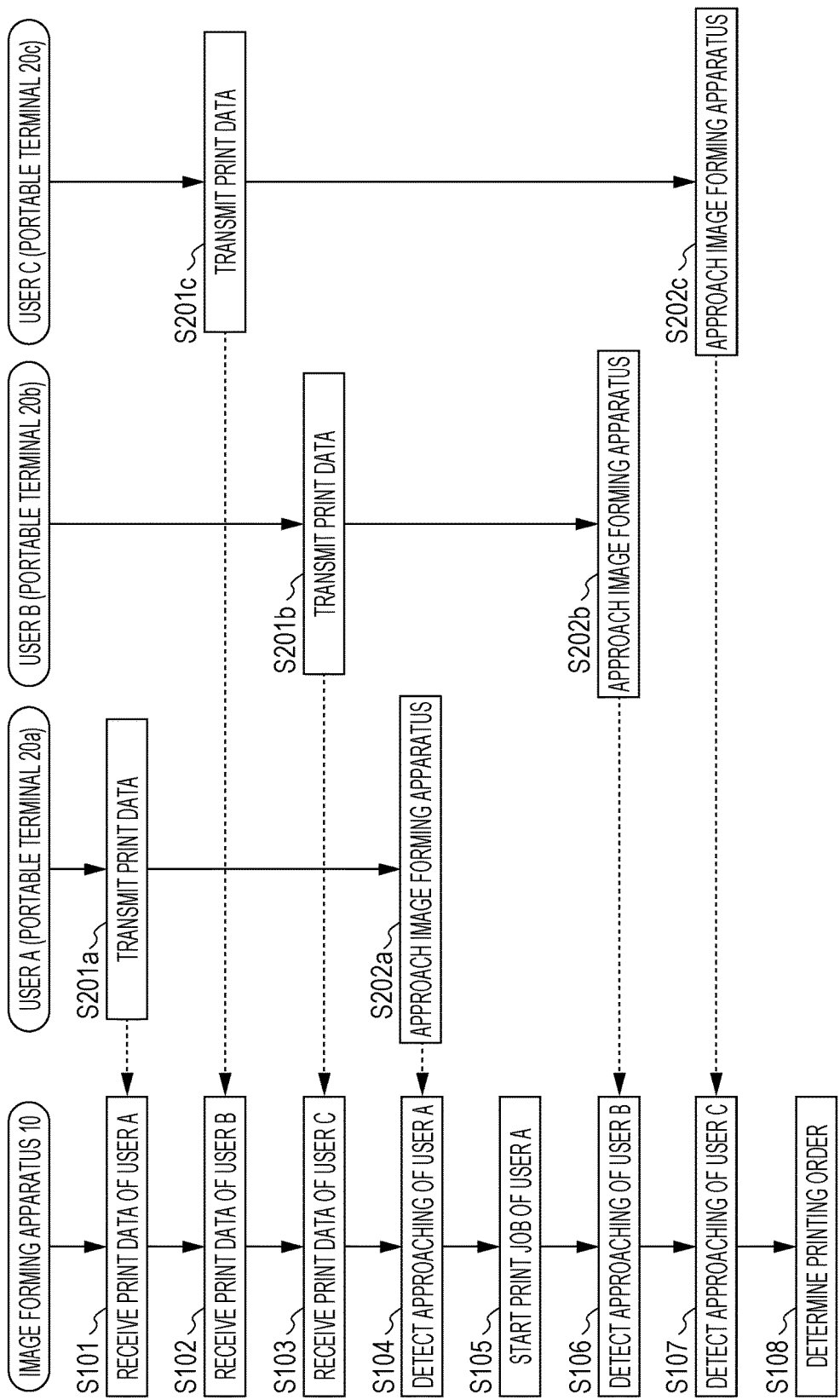
FIG. 3 is a sequence diagram illustrating an example of the procedure for determining the order in which print jobs based on print data are to be executed.

FIG. 3 is a sequence diagram illustrating an example of the procedure for determining the order in which print jobs based on print data are to be executed. In the following description, the user of the portable terminal 20a, the user of the portable terminal 20b, and the user of a portable terminal 20c will be respectively referred to as Users A, B, and C.

As illustrated in FIG. 3, first, when User A transmits print data by using the portable terminal 20a (step 201a), the image forming apparatus 10 receives this print data (step 101). Next, when User C transmits print data by using the portable terminal 20c (step 201c), the image forming apparatus 10 receives this print data (step 102). Next, when User B transmits print data by using the portable terminal 20b (step 201b), the image forming apparatus 10 receives this print data (step 103).

Then, when User A approaches the image forming apparatus 10 while carrying the portable terminal 20a (step 202a), the image forming apparatus 10 detects that the portable terminal 20a has come within the print start distance of the image forming apparatus 10 (step 104), and starts a print job based on the print data transmitted by User A (step 105). Next, when User B approaches the image forming apparatus 10 while carrying the portable terminal 20b (step 202b), the image forming apparatus 10 detects that the portable terminal 20b has come within the print start distance of the image forming apparatus 10 (step 106). Further, when User C approaches the image forming apparatus 10 while carrying the portable terminal 20c (step 202c), the image forming apparatus 10 detects that the portable terminal 20c has come within the print start distance of the image forming apparatus 10 (step 107).

As described above, when User B and User C come within the print start distance of the image forming apparatus 10 during the execution of a print job based on the print data transmitted by User A, the image forming apparatus 10 determines the order in which a print job based on the print data transmitted by User B, and a print job based on the print data transmitted by User C are to be executed (step 108). For example, the printing order may be determined to be the first order. In this case, printing is performed in the following order: the print job based on the print data transmitted by User C first, and then the print job based on the print data transmitted by User B. The printing order may be determined to be the second order. In this case, printing is performed in the following order: the print job based on the print data transmitted by User B first, and then the print job based on the print data transmitted by User C.

In the above example, the order in which to execute the print job based on the print data transmitted by User B, and the print job based on the print data transmitted by User C is determined when these users come within the print start distance of the image forming apparatus 10. However, this is not to be construed in a limiting sense. In an alternative configuration, information indicating that these users have come within the print start distance is stored, and the printing order is determined when the print job based on the print data transmitted by User A is finished.

The printing order illustrated in FIG. 3 is for illustrative purposes only. In a more general sense, this order may be understood as an order determined by a predetermined rule. That is, the first order is an order determined by the following rule: a print job based on the print-instruction information that is stored first in time is to be executed first. The second order is an order determined by the following rule: a print job based on print-instruction information stored upon request from a print-instruction originator who uses the portable terminal 20 that first comes within a proximate distance is to be executed first.

Further, the image forming apparatus 10 determines that a mix-up of printed materials can occur between different users, either unconditionally or when one of the conditions described below is met. Alternatively, the image forming apparatus 10 may determine that a mix-up of printed materials can occur between different users, when the multiple conditions described below are met.

A first condition is that multiple pieces of print data are stored.

A second condition is that while a print job based on given print data is executed, the portable terminal 20 of a user who has transmitted print data different from this print data exists within the print start distance.

A third condition is that after the completion of a print job based on given print data, the portable terminal 20 of a user who has transmitted this print data exists within a predetermined second distance, and the portable terminal 20 of a user who has transmitted print data different from this print data comes within the print start distance. Alternatively, the third condition may be a condition from which the following condition is excluded: the portable terminal 20 of a user who has transmitted the print data for a print job that is now complete exists within the predetermined second distance.

A fourth condition is that after the completion of a print job based on given print data, the portable terminal 20 of a user who has transmitted print data different from this print data comes within the print start distance before a predetermined time elapses.

A fifth condition is that before the start of a print job based on given print data, the portable terminal 20 of a user who has transmitted this print data comes within the print start distance, and then a user who has transmitted print data different from this print data comes within the print start distance within a predetermined period of time.

Further, when the image forming apparatus 10 determines that a mix-up of printed materials can occur between different users, the image forming apparatus 10 executes one of the processes described below to prevent a mix-up of printed materials between different users. Alternatively, the image forming apparatus 10 may execute the multiple processes described below.

A first process involves, prior to the start of or during the execution of a print job based on given print data, displaying information about the user who has transmitted the print data (for example, user name) on the operation panel 15.

A second process involves, prior to the start of a print job based on given print data, information about the user who has transmitted the print data (for example, user name) on the operation panel 15 to inquire for permission to start the print job, and starting the print job after the permission to start the print job is obtained.

A third process involves generating an alarm sound indicating that multiple portable terminals 20 that have transmitted print data exist within the print start distance.

A fourth process involves, prior to the start of a print job based on given print data, making an inquiry to the portable terminal 20 of the user who has transmitted the print data for permission to start the print job, and starting the print job after the permission to start the print job is obtained.

A fifth process involves, during the execution of a print job based on given print data, providing notification of the printing order or the progress of printing to the portable terminal 20 of each user who has transmitted print data used for the next or subsequent print jobs.

Alternatively, the fifth process may be such that, irrespective of whether a print job based on given print data is being currently executed, if there are multiple pieces of print data stored, at least one of the portable terminals 20 of multiple users who have transmitted the multiple pieces of print data is notified of the printing order or the progress of printing.

A sixth process involves, after the start of a print job based on given print data, generating sound or vibration in the portable terminal 20 of the user who has transmitted the print data to notify the user that the print job has started.

A seventh process involves, even when the execution of a print job is possible, starting the print job after waiting for a predetermined time in advance following the completion of the previous print job.

Figure 4B:
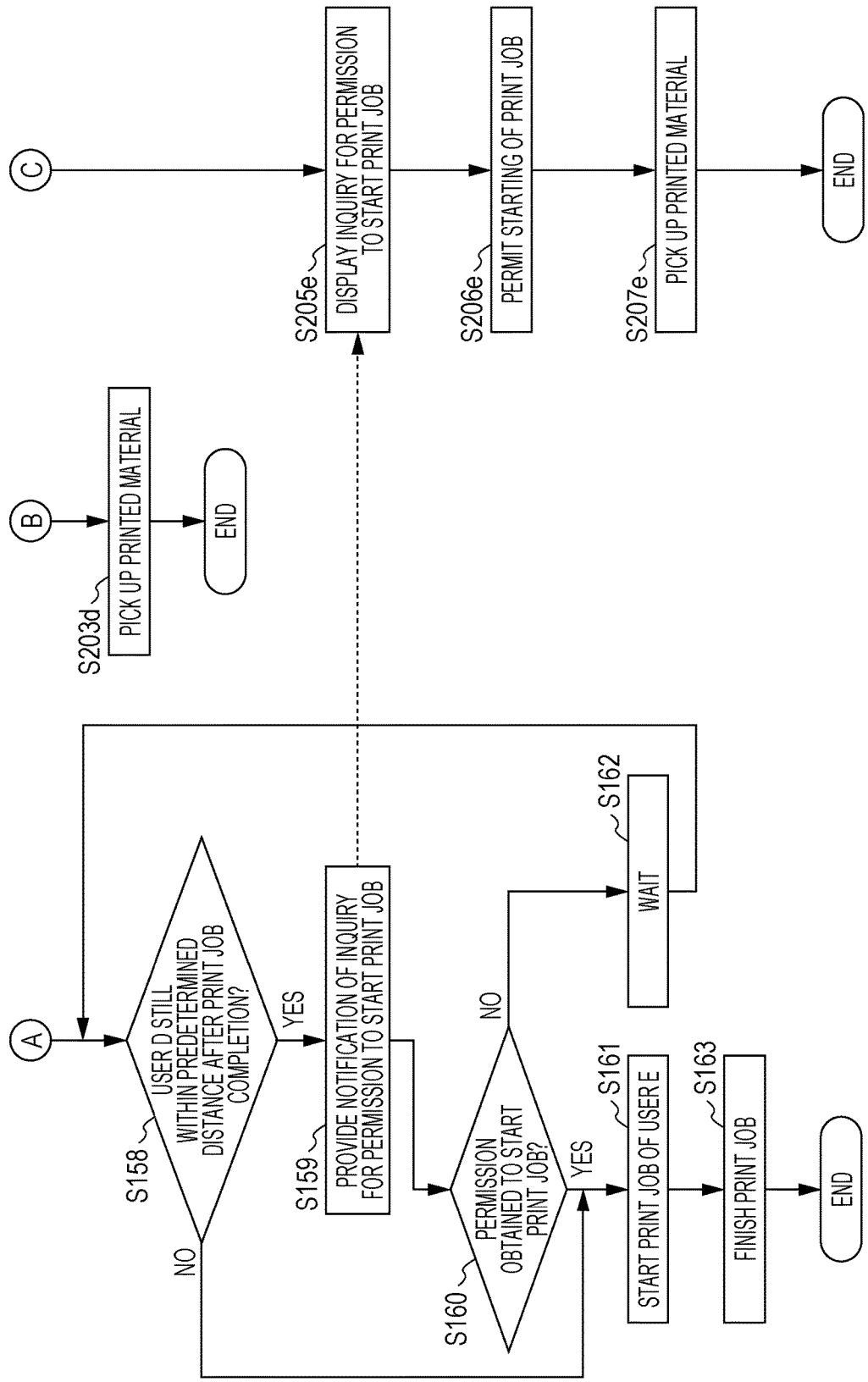
FIG. 4B is a sequence diagram illustrating an example of the procedure for preventing a mix-up of printed materials between different users.

FIGS. 4A and 4B are each a sequence diagram illustrating an example of the procedure for preventing a mix-up of printed materials between different users. FIGS. 4A and 4B illustrate the procedure for preventing a mix-up of printed materials in the following situation: While a print job based on print data transmitted by User D is executed, User E approaches the image forming apparatus 10 to have a print job executed by the image forming apparatus 10. In the following description, the user of a portable terminal 20d and the user of a portable terminal 20e will be respectively referred to as Users D and E.

First, as illustrated in FIG. 4A, when User D transmits print data by using the portable terminal 20d (step 201d), the image forming apparatus 10 receives this print data (step 151). Next, when User E transmits print data by using the portable terminal 20e (step 201e), the image forming apparatus 10 receives this print data (step 152).

Then, when User D approaches the image forming apparatus 10 while carrying the portable terminal 20d (step 202d), the image forming apparatus 10 detects that the portable terminal 20d has come within the print start distance of the image forming apparatus 10 (step 153), and starts a print job based on the print data transmitted by User D (step 154). Then, the image forming apparatus 10 determines whether there is a possibility of the printed material of User D being picked up by a wrong user due to the presence of the portable terminal 20 of a user different from User D within the print start distance (step 155). This determination corresponds to a determination of whether the second condition mentioned above is met.

Now, suppose that while a print job based on print data transmitted by User D is executed, User E carrying the portable terminal 20e comes within the print start distance (step 202e). Then, the image forming apparatus 10 determines that there is a possibility of the printed material of User D being picked up by User E by mistake. Accordingly, to ensure that User E does not pick up the printed material of User D by mistake, the image forming apparatus 10 notifies the portable terminal 20e of the order of printing and the progress of printing (step 156). As a result, the portable terminal 20e receives and displays information about the order of printing and the progress of printing (step 203e). This process for preventing a mix-up corresponds to the fifth process mentioned above. If User E carrying the portable terminal 20e does not come within the print start distance while a print job based on print data transmitted by User D is executed, the image forming apparatus 10 does not perform the notification at step 156.

Thereafter, the image forming apparatus 10 finishes the print job based on print data transmitted by User D (step 157), and the portable terminal 20e displays information indicating that the print job originated by User D is complete (step 204e).

Once the print job originated by User D is thus complete, first, as illustrated in FIG. 4B, the image forming apparatus 10 determines whether the portable terminal 20d exists within the predetermined second distance (step 158). This determination is made for the following reason. That is, once the print job of User D is finished, User D will pick up the printed material before very long (step 203d). At this time, if the portable terminal 20d exists within the predetermined second distance, this may indicate that User D has not picked up the printed material yet. If the print job originated by User E is started in this state, a mix-up of printed materials can occur owing to the presence of different printed materials at the same time. This determination corresponds to a determination of whether the third condition mentioned above is met.

If the image forming apparatus 10 determines that the portable terminal 20d exists within the predetermined second distance, the image forming apparatus 10 inquires with the portable terminal 20e of User E for permission to start the print job (step 159). As a result, the portable terminal 20e displays the inquiry for permission to start the print job (step 205e). Then, the image forming apparatus 10 determines whether the permission to start the print job is obtained from User E (step 160). When User E inputs information indicating permission to start the print job (step 206e), the image forming apparatus 10 determines that the permission has been obtained, and starts the print job based on print data transmitted by User E (step 161). If no permission is obtained, the image forming apparatus 10 waits for a predetermined period of time (step 162), and the process returns to step 158. Then, until User D leaves and moves out of the predetermined second distance, the image forming apparatus 10 does not start the print job based on print data transmitted by User E. This process for preventing a mix-up corresponds to the fourth process mentioned above.

Then, the image forming apparatus 10 finishes the print job based on print data transmitted by User E (step 163), after which User E is to pick up the printed material (step 207e).

The "predetermined second distance" at step 158 may be a distance determined independently of the print start distance. However, for the ease of explanation, the following description assumes that the "predetermined second distance" at step 158 is the print start distance.

The procedure for preventing a mix-up of printing materials between different users illustrated in FIGS. 4A and 4B is for illustrative purposes only, and is not to be construed in a limiting sense.

For example, a determination of whether a mix-up of printed materials can occur may be made prior to starting a print job at step 154. In this case, the possibility of a mix-up of printed materials may be determined to exist either unconditionally or if the first condition or fifth condition mentioned above is met.

The process through steps 156 to 159 for preventing a mix-up of printed materials between different users may be replaced by a different one of the first to seventh processes mentioned above, or a different one of the first to seventh processes mentioned above may be executed in addition to this process.

Further, at step 159, the inquiry for permission to start the print job may be made not only to the portable terminal 20e but also to the portable terminal 20d. In that case, the image forming apparatus 10 does not start the print job unless permission is obtained from both User D and User E.

Functional Configuration of Information Processor

FIG. 5 is a block diagram illustrating an example of the functional configuration of an information processor 30 that implements the general operation of the image forming apparatus 10 mentioned above. The information processor 30 may be understood as a unit implemented when the CPU 11 (see FIG. 2) of the image forming apparatus 10 reads a program for implementing various functional units described later from the ROM 13 (see FIG. 2) to the RAM 12 (see FIG. 2) and executes the program. As illustrated in FIG. 5, the information processor 30 includes a print data acquiring unit 31, a print data list storage unit 32, a user detector 33, and a user list storage unit 34. The information processor 30 also includes a printing order determining unit 35, a mix-up determining unit 36, a mix-up prevention processor 37, and a print data output unit 38.

When the wire communication I/E 18 or the wireless communication I/F 191 receives print data and user information indicating the user of the portable terminal 20 from the portable terminal 20, the print data acquiring unit 31 acquires the print data and the user information.

The print data list storage unit 32 stores a print data list in which the print data and the user information acquired by the print data acquiring unit 31 are associated with each other in list form. Each row in the print data list also has items such as print status, which indicates the status of a print job based on print data, and printing order, which indicates the order in which each print job based on print data is to be executed. In the exemplary embodiment, the print data list storage unit 32 serves as an example of a memory that stores print-instruction information.

When the wireless communication I/F 191 picks up the intensity of radio waves generated by the portable terminal 20, the user detector 33 acquires this radio wave intensity, and calculates the distance to the portable terminal 20 based on this radio wave intensity. When the wireless communication I/F 191 receives user information indicating the user of the portable terminal 20 from the portable terminal 20, the user detector 33 acquires this user information if a print data list including this user information is stored in the print data list storage unit 32. When the distance of the corresponding user to the portable terminal 20 becomes less than the print start distance, the user detector 33 detects the acquired user information as user information indicating the user who is present within the print start distance.

The user list storage unit 34 stores a user list in which user information detected by the user detector 33 is stored in list form.

The printing order determining unit 35 determines, for any one of those rows whose print status is "Printing" or "In Queue" in the print data list stored in the print data list storage unit 32, the printing order indicating the order of printing, and writes the determined printing order into the print data list.

The mix-up determining unit 36 determines whether a mix-up of printed materials can occur between different users, based on the printed data list stored in the print data list storage unit 32, and the user list stored in the user list storage unit 34.

The mix-up prevention processor 37 performs, when it is determined by the mix-up determining unit 36 that a mix-up of printed materials can occur between different users, processes such as provision of notification or inquiry necessary for preventing a mix-up of printed materials between different users. In the exemplary embodiment, the mix-up prevention processor 37 serves as an example of each of a notifying unit and an inquiring unit.

The print data output unit 38 reads print data from the print data list storage unit 32 as instructed from the printing order determining unit 35 or the mix-up determining unit 36, and outputs the print data to the image forming unit 17 (see FIG. 2). At this time, if one of the rows in the print data list stored in the print data list storage unit 32 has a status "In Queue", the print data output unit 38 outputs the print data for that row to the image forming unit 17. If multiple rows in the print data list stored in the print data list storage unit 32 have a status "In Queue", the print data output unit 38 outputs the print data for the one of these rows that comes first in the printing order to the image forming unit 17. The print data output unit 38 then rewrites the print status for the corresponding print data to "Printing". When the print data output unit 38 is notified of the completion of a print job based on given print data from the image forming unit 17, the print data output unit 38 rewrites the print status for the corresponding print data to "Complete", and informs the mix-up determining unit 36 to that effect.

Now, the print data list stored in the print data list storage unit 32 will be described. FIGS. 6A to 6D each illustrate an example of the contents of the print data list. As illustrated in FIGS. 6A to 6D, each row in the print data list includes the following items: Storage No., User Information, Print Data, Print Status, and Printing Order.

The Storage No. represents a number indicating the relative order in which the corresponding print data has been stored. The User Information represents information indicating the user who has transmitted the corresponding print data. For example, a user ID uniquely assigned to each individual user may be used as such information. The Print Data represents data used for printing in the image forming apparatus 10, and includes image data and print settings as described above. The Print Status represents information related to the progress of a print job based on the corresponding print data. The Printing Order represents information indicating the relative order in which the print job based on the corresponding print data is to be executed. This information is set for print data whose print status is "Printing" or "In Queue".

FIG. 6A illustrates an example of the contents of the print data list stored upon the execution of step 105 in FIG. 3. FIG. 63 illustrates an example of the contents of the print data list stored upon the execution of step 108 in FIG. 3. FIG. 6C illustrates an example of the contents of the user list stored at the time when a YES determination is made at step 155 in FIG. 4A. FIG. 6D illustrates an example of the contents of the user list stored at the time when a NO determination is made at step 158 in FIG. 4B.

The user list stored in the user list storage unit 34 will be also described below. FIGS. 7A to 7D each illustrate an example of the contents of the user data list. As illustrated in FIGS. 7A to 7D, each row in the user list includes Approach No. and User Information.

The Approach No. represents a number indicating the relative order in which the user indicated by the corresponding user information has approached the image forming apparatus 10. The User Information represents information indicating the user who has approached the image forming apparatus 10. For example, a user ID uniquely assigned to each individual user may be used as such information.

FIG. 7A illustrates an example of the contents of the user list stored upon the execution of step 105 in FIG. 3. FIG. 7B illustrates an example of the contents of the user list stored upon the execution of step 108 in FIG. 3. FIG. 7C illustrates an example of the contents of the user list stored at the time when a YES determination is made at step 155 in FIG. 4A. FIG. 7D illustrates an example of the contents of the user list stored at the time when a NO determination is made at step 158 in FIG. 4B.

Operation of Information Processor

In the information processor 30, first, the print data acquiring unit 31 acquires print data and user information received by the wire communication I/F 18 or the wireless communication I/F 191, and stores a print data list, which is a list detailing the correspondence between the received print data and the received user information, into the print data list storage unit 32. The user detector 33 stores a user list into the user list storage unit 34. This user list is a list of those pieces of user information received by the wireless communication I/F 191 which are contained in the print data list stored in the print data list storage unit 32.

In the exemplary embodiment, in this state, the printing order determining unit 35 determines the order of print jobs based on the print data included in the print data list stored in the print data list storage unit 32.

Figure 8:
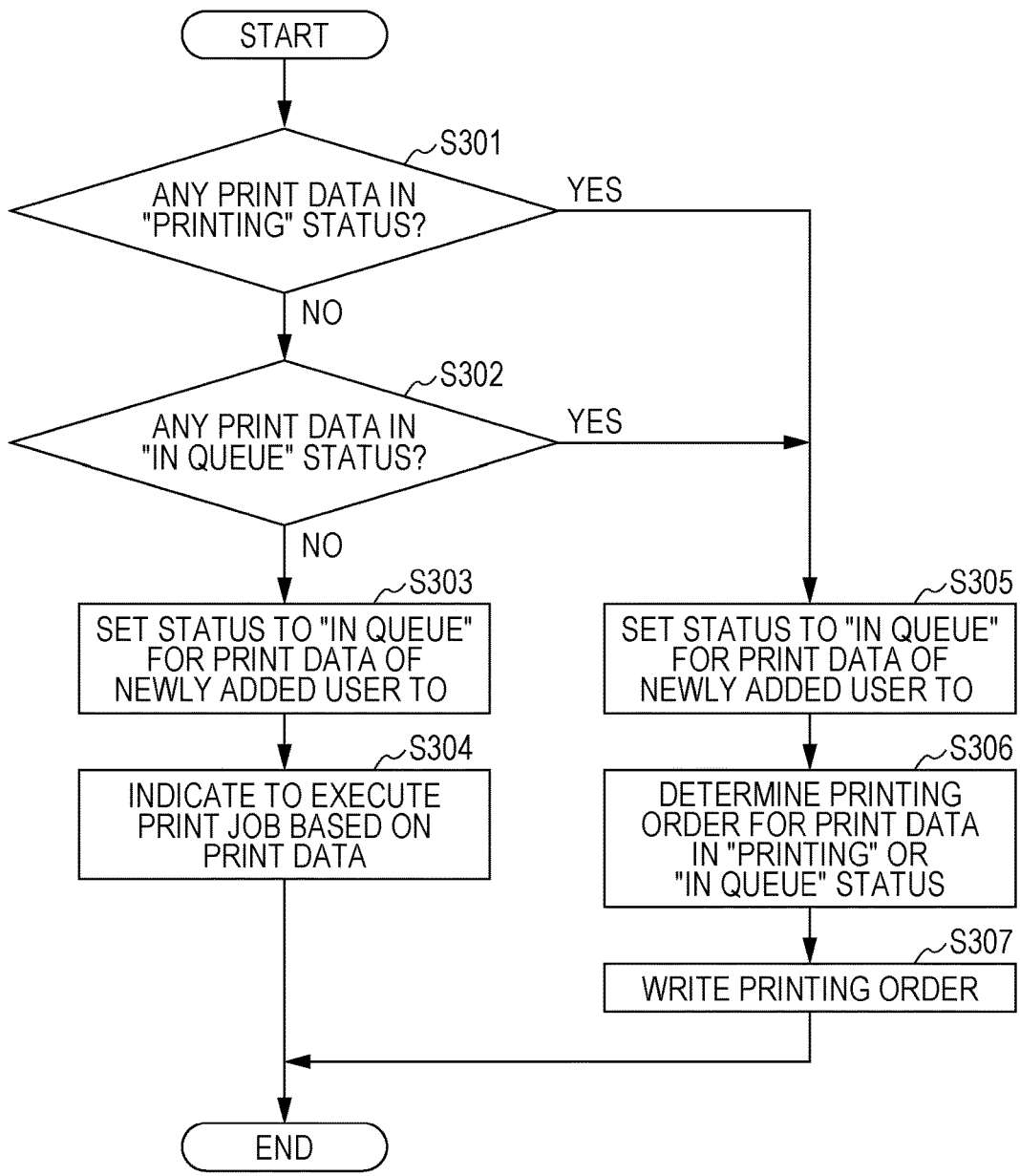
FIG. 8 is a flowchart illustrating an exemplary operation of a printing order determining unit in the information processor according to the exemplary embodiment.

FIG. 8 is a flowchart illustrating an exemplary operation of the printing order determining unit 35 at this time. This exemplary operation is started when new user information is added to the user list stored in the user list storage unit 34.

As illustrated in FIG. 8, the printing order determining unit 35 first determines whether the print data list stored in the print data list storage unit 32 has any row whose print status is "Printing" (step 301). If the printing order determining unit 35 determines that there is no row whose print status is "Printing", the printing order determining unit 35 determines whether the print data list has any row whose print status is "In Queue" (step 302).

At this time, if the printing order determining unit 35 determines that there is no row whose print status is "In Queue", the printing order determining unit 35 sets the print status to "In Queue" for each one of rows in the print data list that contains user information newly added to the user list (step 303). Then, the printing order determining unit 35 indicates to the print data output unit 38 that a print job based on the print data in this row is to be executed (step 304). As a result, the print data output unit 38 reads the indicated print data from the print data list storage unit 32, outputs the print data to the image forming unit 17 (see FIG. 2), and rewrites the print status corresponding to this print data to "Printing".

For example, if this exemplary operation is started in response to the detection of user information at step 104 in FIG. 3, the Print Status field in the print data list is blank at first for all users. In this case, as illustrated in FIG. 7A, the user list indicates that User A is the user newly added to the list. Accordingly, a print job based on the print data corresponding to User A in the print data list is executed, and the print status for this print data is rewritten to "Printing" as illustrated in FIG. 6A.

If the printing order determining unit 35 determines at step 301 that there is a row whose print status is "Printing", the printing order determining unit 35 sets the print status to "In Queue" for each one of rows in the print data list that contains user information newly added to the user list (step 305). Then, the printing order determining unit 35 determines the printing order for each of rows in the print data list that has a print status "Printing" or "In Queue" (step 306). Specifically, a row whose print status is "Printing" may be given an ordinal number of "1". A row whose print status is "In Queue" may be given an ordinal number of "2" or greater. At that time, the printing order may be determined to be either the first order or the second order mentioned above. Thereafter, the printing order determining unit 35 writes the determined printing order to the print data list stored in the print data list storage unit 32 (step 307). As a result, once the print data output unit 38 becomes ready to output print data to the image forming unit 17 (see FIG. 2), the print data output unit 38 reads print data from the print data list storage unit 32 in accordance with the printing order, outputs the read print data to the image forming unit 17, and rewrites the print status corresponding to this print data to "Printing".

For example, suppose that this exemplary operation is started in response to the detection of user information at step 107 in FIG. 3. In this case, the user list indicates that users are added in the order User A, User B, and User C as illustrated in FIG. 7B, and the print data list indicates that the print status corresponding to User A is "Printing" and that the print status corresponding to each of Users B and C is "In Queue" as illustrated in FIG. 6B. The Printing Order field is blank at first for all users. Now, suppose, for example, that the second order mentioned above is determined as the printing order. In this case, as illustrated in FIG. 6B, the print job corresponding to User A is given an ordinal number of "1", the print job corresponding to User C is given an ordinal number of "3", and the print job corresponding to User B is given an ordinal number of "2".

In some situations, even though it is determined at step 301 that there is no row with a print status "Printing", it is determined at step 302 that there is a row with a print status "In Queue". Such a situation may occur when, for example, although a print job based on the print data for a row previously in the "Printing" status has finished, a print job based on the print data for a row in the "In Queue" status has not been started. In this case as well, the process through steps 305 to 307 may be executed.

In the exemplary embodiment, the mix-up determining unit 36 determines whether a mix-up of printed materials can occur between different users. If the mix-up determining unit 36 determines that a mix-up of printed materials can occur between different users, the mix-up prevention processor 37 executes a process for preventing a mix-up of printed materials between different users.

Figure 9A:
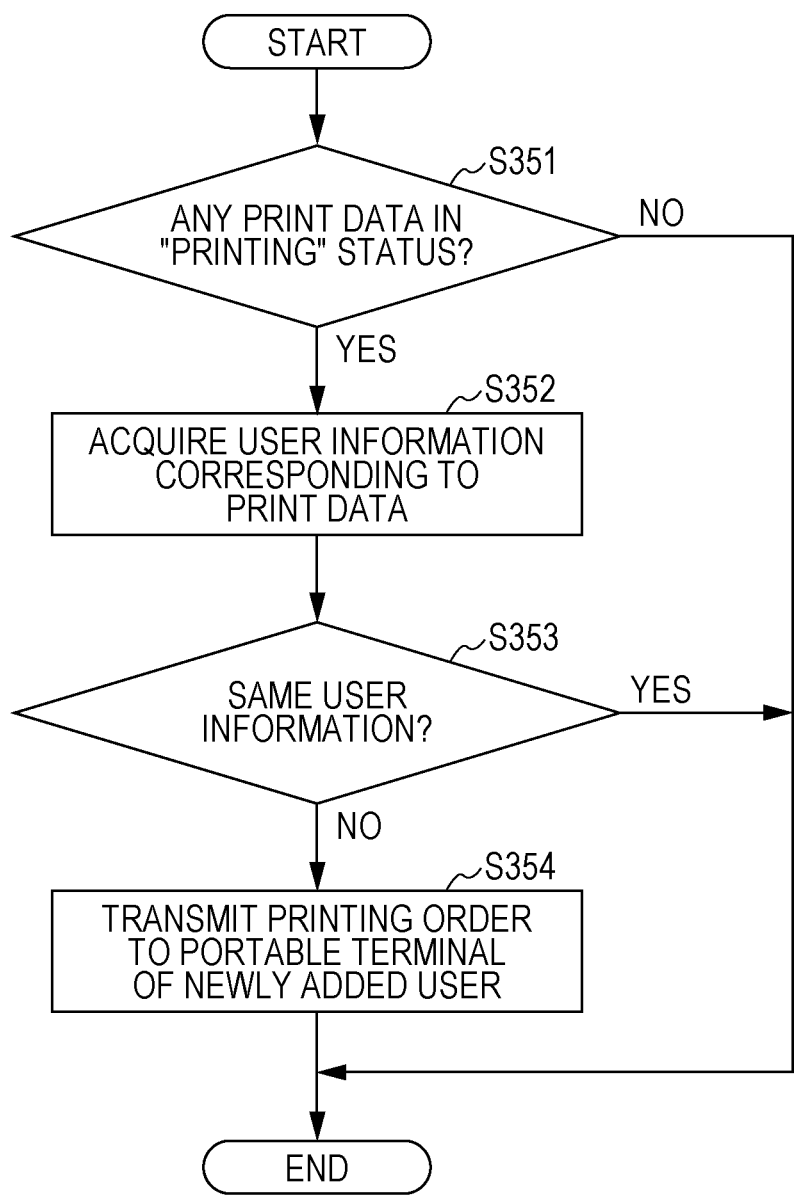
FIG. 9A is a flowchart illustrating a first exemplary operation of a mix-up determining unit and a mix-up prevention processor in the information processor according to the exemplary embodiment.

FIG. 9A is a flowchart illustrating a first exemplary operation of the mix-up determining unit 36 and the mix-up prevention processor 37 at this time. This first exemplary operation is started when new user information is added to the user list stored in the user list storage unit 34.

As illustrated in FIG. 9A, the mix-up determining unit 36 first determines whether the print data list stored in the print data list storage unit 32 has any row whose print status is "Printing" (step 351). If the mix-up determining unit 36 determines that there is a row whose print status is "Printing", the mix-up determining unit 36 acquires user information corresponding to the row (step 352). Then, the mix-up determining unit 36 determines whether the acquired user information and the user information newly added to the user list indicate the same user (step 353). If it is determined that these pieces of user information do not indicate the same user, then a mix-up of printed materials can occur between these users. Accordingly, the mix-up prevention processor 37 outputs information on printing order to the wireless communication I/F 191 so that the information is transmitted to the portable terminal 20 of the user whose user information has been newly added to the user list (step 354). As a result, the wireless communication I/F 191 transmits information on printing order to the portable terminal 20 of the user whose user information has been newly added to the user list. Since the procedure illustrated in FIG. 8 is also executed in a parallel manner when new user information is added to the user list stored in the user list storage unit 34, the printing order transmitted at this time is the printing order written to the print data list at step 307 in FIG. 8.

For example, suppose that this exemplary operation is started in response to the detection of user information at step 155 in FIG. 4A. In this case, the user list indicates that users are added in the order User D and User E as illustrated in FIG. 7C, and the print data list indicates that the print status corresponding to User D is "Printing" and that the print status corresponding to User E is "In Queue" as illustrated in FIG. 6C. The Printing Order field is blank at first for each of these users. At this time, irrespective of whether the first order or the second order mentioned above is determined as the printing order, as illustrated in FIG. 6C, the print job corresponding to User D is given an ordinal number of "1", and the print job corresponding to User E is given an ordinal number of "2". Thus, the portable terminal 20e of User E receives transmission of information indicating that printing will be executed in the following order: the print job based on the print data transmitted by User D first, and then the print job based on the print data transmitted by User E.

If it is determined at step 351 that there is no row whose print status is "Printing", this means that a mix-up of printed materials is unlikely to occur. Thus, the mix-up determining unit 36 ends the process with no further processing. An example of a case where it is determined at step 353 that the same user is indicated by user information corresponding to a row with a print status "Printing", and user information newly added to the user list is when the user in question approaches the image forming apparatus 10 to instruct the image forming apparatus 10 to print, then leaves the image forming apparatus 10 once, and then approaches the image forming apparatus 10 again. In this case as well, a mix-up of printed materials is unlikely to occur, and thus the mix-up determining unit 36 ends the process with no further processing.

Figure 9B:
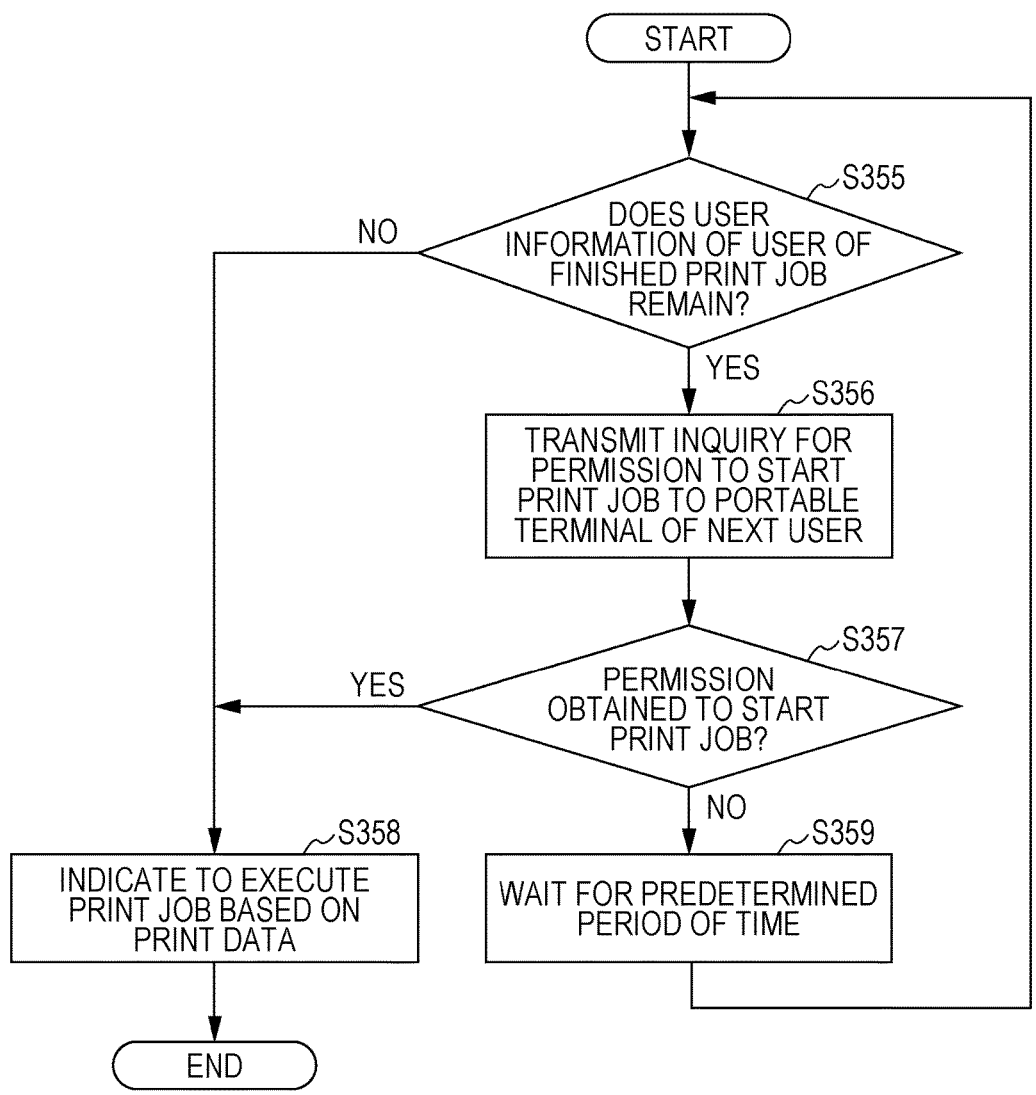
FIG. 9B is a flowchart illustrating a second exemplary operation of the mix-up determining unit and the mix-up prevention processor in the information processor according to the exemplary embodiment.

FIG. 9B is a flowchart illustrating a second exemplary operation of the mix-up determining unit 36 and the mix-up prevention processor 37. This second exemplary operation is started when an indication of the completion of a print job in the image forming apparatus 10 is transmitted from the print data output unit 38.

As illustrated in FIG. 9B, the mix-up determining unit 36 first determines whether the print data list stored in the user list storage unit 34 contains the user information of the user who has originated the finished print job (step 355). If the mix-up determining unit 36 determines that the user list contains such user information, this indicates that the user who is the originator of the finished print job has not picked up the printed material yet, and hence a mix-up of printed materials can occur. Accordingly, the mix-up prevention processor 37 outputs an inquiry for permission to start the print job, to the wireless communication I/F 191 so that the inquiry is transmitted to the portable terminal 20 of the next user (step 356). As a result, the wireless communication I/F 191 transmits the inquiry to the portable terminal 20 of the next user. Supposing that the ordinal number "1" is assigned to a print job whose print status is "Printing" in the print data list, the "next user" refers to a user who is assigned the ordinal number "2".

The mix-up prevention processor 37 then determines whether, as a result of this inquiry, the permission to start the print job is obtained from another user (step 357). If the permission to start the print job is obtained, the mix-up determining unit 36 indicates to the print data output unit 38 that the print job based on the print data of the next user stored in the print data list is to be executed (step 358). As a result, the print data output unit 38 reads the print data of the next user from the print data list storage unit 32, outputs the print data to the image forming unit 17 (see FIG. 2), and rewrites the print status corresponding to this print data to "Printing". At this time, the print data corresponding to the finished print job may be deleted from the print data list storage unit 32.

If the permission to start the print job is not obtained at step 357, after a wait of a predetermined period of time, the process returns to step 355. Then, the mix-up determining unit 36 again determines whether the print data list stored in the user list storage unit 34 contains user information of the user who has originated the finished print job (step 355). For example, if the user corresponding to the finished print job leaves and moves out of the print start distance, then a mix-up of printed materials is unlikely to occur, and thus the process terminates.

For example, if this exemplary operation is started in response to the completion of a print job at step 157 in FIG. 4A, the user list initially contains Users D and E. At this time, as illustrated in FIG. 6D, the print data list indicates that the print status corresponding to User D is "Complete", and that the print status corresponding to User E is "In Queue". Now, suppose that User D has moved out of the print start distance. Then, as illustrated in FIG. 7D, only User E is contained in the user list. Thus, a print job based on the print data transmitted by User E is to be executed.

Program

The processes executed by the information processor 30 according to the exemplary embodiment are provided as a program such as application software.

That is, a program for implementing the exemplary embodiment may be understood as a program causing a computer to execute a process, the process including storing, upon request from a first print-instruction originator, first print-instruction information that instructs a printing apparatus to print, in association with the first print-instruction originator, and storing, upon request from a second print-instruction originator, second print-instruction information that instructs the printing apparatus to print, in association with the second print-instruction originator, and executing, in an order determined by a predetermined rule, a print job based on the first print-instruction information stored in association with the first print-instruction originator, and a print job based on the second print-instruction information stored in association with the second print-instruction originator, when a first terminal apparatus used by the first print-instruction originator and a second terminal apparatus used by the second print-instruction originator exist within a predetermined first distance with reference to the printing apparatus.

In addition to being provided via a communication unit, the program for implementing the exemplary embodiment may of course be stored on a recording medium such as a CD-ROM and provided via the CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus comprising:
   a memory that stores, upon request from a first print-instruction originator, first print-instruction information that instructs the printing apparatus to print, in association with the first print-instruction originator, and stores, upon request from a second print-instruction originator, second print-instruction information that instructs the printing apparatus to print, in association with the second print-instruction originator;
   a printer that executes, in an order determined by a predetermined rule, a print job based on the first print-instruction information stored in association with the first print-instruction originator, and a print job based on the second print-instruction information stored in association with the second print-instruction originator, when a first terminal apparatus used by the first print-instruction originator and a second terminal apparatus used by the second print-instruction originator exist within a predetermined first distance with reference to the printing apparatus; and
   a processor that notifies at least one of the first terminal apparatus and the second terminal apparatus of the order determined by the predetermined rule, wherein when the print job based on the first print-instruction information has been started, and the print job based on the second print-instruction information has not been started, the processor does not notify the first terminal apparatus of the order determined by the predetermined rule, and notifies the second terminal apparatus of the order determined by the predetermined rule.

2. The printing apparatus according to claim 1, wherein as the predetermined rule, the printer uses a rule specifying that a print job based on one of the first print-instruction information and the second print-instruction information that is stored earlier than the other is to be executed first.

3. The printing apparatus according to claim 1, wherein as the predetermined rule, the printer uses a rule specifying that a print job based on print-instruction information stored upon request from a print-instruction originator who uses one of the first terminal apparatus and the second terminal apparatus that comes within the first distance earlier than the other is to be executed first.

4. The printing apparatus according to claim 1, wherein
when the print job based on the first print-instruction information has finished, and the print job based on the second print-instruction information has not been started, the processor makes an inquiry to the second terminal apparatus for permission to start the print job based on the second print-instruction information, wherein
the printer starts the print job based on the second print-instruction information when an indication of permission to start the print job based on the second print-instruction information is input in response to the inquiry made by the processor.

5. The printing apparatus according to claim 4, wherein
when the print job based on the first print-instruction information has finished, the first terminal apparatus exists within a predetermined second distance, and the print job based on the second print-instruction information has not been started, the processor makes an inquiry to the second terminal apparatus for permission to start the print job based on the second print-instruction information.

6. The printing apparatus according to claim 5, wherein
if no indication of permission to start the print job based on the second print-instruction information is input in response to the inquiry made by the processor, the printer starts the print job based on the second print-instruction information once the first terminal apparatus is no longer within the second distance.

7. The printing apparatus according to claim 1, wherein
prior to starting or during execution of the print job based on the first print-instruction information, the printing apparatus displays information regarding the first print-instruction originator, and
prior to starting or during execution of the print job based on the second print-instruction information, the printing apparatus displays information regarding the second print-instruction originator.

8. The printing apparatus according to claim 1, wherein
the printing apparatus generates an alarm sound when both the first terminal apparatus and the second terminal apparatus exist within the predetermined first distance and have transmitted print data.

9. A non-transitory computer readable medium storing a program causing a computer to execute a process, the process comprising:
storing, upon request from a first print-instruction originator, first print-instruction information that instructs a printing apparatus to print, in association with the first print-instruction originator, and storing, upon request from a second print-instruction originator, second print-instruction information that instructs the printing apparatus to print, in association with the second print-instruction originator;
executing, in an order determined by a predetermined rule, a print job based on the first print-instruction information stored in association with the first print-instruction originator, and a print job based on the second print-instruction information stored in association with the second print-instruction originator, when a first terminal apparatus used by the first print-instruction originator and a second terminal apparatus used by the second print-instruction originator exist within a predetermined first distance with reference to the printing apparatus; and
notifying at least one of the first terminal apparatus and the second terminal apparatus of the order determined by the predetermined rule, wherein when the print job based on the first print-instruction information has been started, and the print job based on the second print-instruction information has not been started, the first terminal apparatus is not notified of the order determined by the predetermined rule, and the second terminal apparatus is notified of the order determined by the predetermined rule.

10. The non-transitory computer readable medium according to claim 9, wherein
as the predetermined rule, a rule is used specifying that a print job based on one of the first print-instruction information and the second print-instruction information that is stored earlier than the other is to be executed first.

11. The non-transitory computer readable medium according to claim 9, wherein
as the predetermined rule, a rule is used specifying that a print job based on print-instruction information stored upon request from a print-instruction originator who uses one of the first terminal apparatus and the second terminal apparatus that comes within the first distance earlier than the other is to be executed first.

12. The non-transitory computer readable medium according to claim 9, wherein the process further comprises
displaying information regarding the first print-instruction originator prior to starting or during execution of the print job based on the first print-instruction information, and
displaying information regarding the second print-instruction originator prior to starting or during execution of the print job based on the second print-instruction information.

13. The non-transitory computer readable medium according to claim 9, wherein the process further comprises
generating an alarm sound when both the first terminal apparatus and the second terminal apparatus exist within the predetermined first distance and have transmitted print data.

14. A printing method comprising:
storing, upon request from a first print-instruction originator, first print-instruction information that instructs a printing apparatus to print, in association with the first print-instruction originator, and storing, upon request from a second print-instruction originator, second print-instruction information that instructs the printing apparatus to print, in association with the second print-instruction originator;
executing, in an order determined by a predetermined rule, a print job based on the first print-instruction information stored in association with the first print-instruction originator, and a print job based on the second print-instruction information stored in association with the second print-instruction originator, when a first terminal apparatus used by the first print-instruction originator and a second terminal apparatus used by the second print-instruction originator exist within a predetermined first distance with reference to the printing apparatus; and
notifying at least one of the first terminal apparatus and the second terminal apparatus of the order determined by the predetermined rule, wherein when the print job based on the first print-instruction information has been started, and the print job based on the second print-instruction information has not been started, the first terminal apparatus is not notified of the order determined by the predetermined rule, and the second terminal apparatus is notified of the order determined by the predetermined rule.

\* \* \* \* \*